(12) United States Patent
Friedlaender

(10) Patent No.: US 9,061,443 B2
(45) Date of Patent: Jun. 23, 2015

(54) METHOD AND DEVICE FOR SEPARATING FOREIGN POLYMERS FROM A POLYMER MIXTURE

(75) Inventor: Thomas Friedlaender, Regensburg (DE)

(73) Assignee: KRONES AG, Neutraubling (DE)

( * ) Notice: Subject to any disclaimer, the term of this patent is extended or adjusted under 35 U.S.C. 154(b) by 28 days.

(21) Appl. No.: 13/330,842

(22) Filed: Dec. 20, 2011

(65) Prior Publication Data

US 2012/0157557 A1    Jun. 21, 2012

(30) Foreign Application Priority Data

Dec. 20, 2010 (DE) .......................... 10 2010 063 601

(51) Int. Cl.
*C08J 11/04* (2006.01)
*B29B 17/02* (2006.01)
(Continued)

(52) U.S. Cl.
CPC .......... *B29B 17/02* (2013.01); *B29B 2017/0203* (2013.01); *B29B 2017/0227* (2013.01);
(Continued)

(58) Field of Classification Search
CPC .............. B29B 17/02; B29B 2017/023; B29B 2017/0227; B29B 2017/0234; B29B 2017/0258; B29K 2995/0039; B29K 2995/004; B29K 2995/0041; B29K 2067/003; B29K 2067/046
USPC ..... 521/40, 48, 45.5; 528/480, 502 R, 502 A, 528/502 F, 503; 209/11, 12.1, 233, 234, 209/238, 253, 422, 924; 422/105, 109, 129, 422/130, 145, 146, 147, 245.1, 523, 613, 422/618, 620, 621
See application file for complete search history.

(56) References Cited

U.S. PATENT DOCUMENTS 5,236,603 A    8/1993   Sampson
5,660,282 A    8/1997   Djerf et al.
(Continued)

FOREIGN PATENT DOCUMENTS

CN    1188457 C    2/2005
DE    3722777 A1   1/1989
(Continued)

OTHER PUBLICATIONS

Machine translation of JP 11-226957.*
(Continued)

*Primary Examiner* — Frances Tischler
(74) *Attorney, Agent, or Firm* — Marshall, Gerstein & Borun LLP

(57) ABSTRACT

A method of separating foreign polymers from a polymer mixture that comprises amorphous PET particles and crystalline PET particles, wherein the softening point of the foreign polymers is lower than that of the crystalline PET particles, and wherein the method includes separating the amorphous PET particles from the polymer mixture, heating the resulting polymer mixture to a temperature between the softening point of the foreign polymers and that of the crystalline PET particles, and separating the foreign polymers from the resulting polymer mixture. Also, a device for separating foreign polymers from a polymer mixture that comprises amorphous PET particles and crystalline PET particles, the device including a first separation unit for separating the amorphous PET particles from the polymer mixture, and a second separation unit for separating the foreign polymers from the resulting polymer mixture.

10 Claims, 2 Drawing Sheets

(51) Int. Cl.
    *B29K 27/06*      (2006.01)
    *B29K 67/00*      (2006.01)

(52) U.S. Cl.
    CPC . *B29B2017/0234* (2013.01); *B29B 2017/0258* (2013.01); *B29B 2017/0279* (2013.01); *B29K 2027/06* (2013.01); *B29K 2067/003* (2013.01); *B29K 2067/046* (2013.01); *B29K 2995/0039* (2013.01); *B29K 2995/004* (2013.01)

(56) References Cited

U.S. PATENT DOCUMENTS

2001/0004645 A1    6/2001   Robinson et al.
2007/0123596 A1*   5/2007   Friedlaender et al. .......... 521/48

FOREIGN PATENT DOCUMENTS

| DE | 4004300 A1 | 8/1991 |
| DE | 4303500 A1 | 8/1993 |
| DE | 4337539 A1 | 6/1995 |
| DE | 19953659 A1 | 5/2001 |
| JP | 11226957 A | 8/1999 |
| WO | WO-2005037514 A1 | 4/2005 |

OTHER PUBLICATIONS

Search Report for 10 2010 063 601.0 dated Jun. 8, 2011.
European Search Report for 11186506, dated Mar. 14, 2012.
Notification of First Office Action, The State Intellectual Property Office of P.R. China, Application No. 201110430865.8, dated Dec. 3, 2013.

* cited by examiner

METHOD AND DEVICE FOR SEPARATING FOREIGN POLYMERS FROM A POLYMER MIXTURE

CROSS-REFERENCE TO RELATED APPLICATION

The present application claims the benefit of priority of German Application No. 102010063601.0, filed Dec. 20, 2011. The entire text of the priority application is incorporated herein by reference in its entirety.

FIELD OF THE DISCLOSURE

The disclosure relates to a method and a device for separating foreign polymers from a polymer mixture that comprises amorphous PET particles and crystalline PET particles, and in particular to the purification of polymer flakes from PET bottle waste.

BACKGROUND

In the recycling of PET bottles, the collected bottle material is first shredded to give so-called flakes which have particle diameters within a range of about 1 to 10 mm. About 70% to 90% of the flakes consist of crystalline PET material from the bottle's wall having a wall thickness of less than about 0.5 mm. About 10% to 30% of the flakes consist of amorphous PET material from the neck and bottom regions of the bottles or from ground preforms having wall thicknesses or particle sizes of about 1 mm or more. In addition, the flakes usually contain impurities, such as e.g. foreign polymers, such as polyvinyl chloride (PVC), polyamide (PA), polyolefins, such as polypropylene (PP) or polyethylene (PE), polylactic acid (PLA) or polystyrene (PS).

These foreign polymers are disturbing in the further thermal processing of the PET material, such as recrystallization or extrusion, as they affect the quality of the PET recyclate. In particular, the presence of major quantities of foreign polymers results in a darkening of the PET recyclate as the foreign polymers are at least partially decomposed under the thermal stress. In addition, in particular PVC contains chloride proportions leading to a decomposition of the polymer chains in the thermal reprocessing of the recyclate. To avoid this, the foreign matters must be largely separated off, i.e. preferably to residues of below about 100 ppm in the PET recyclate.

Conventional separation methods are e.g. methods effective due to differences in the specific material density by which polymers of a lower density than PET, such as PP or PE, can be easily separated off. However, by these methods, e.g. PVC can only be insufficiently separated from PET.

Furthermore, methods of separating foreign polymers from PET material are known which are based on the principle of an increased adhesion tendency of the foreign polymers on surfaces compared to PET. Here, the polymer mixture is heated to a certain temperature above the softening point of the foreign polymers to be separated off, but below the softening temperature of the PET material. Subsequently, the mixture is contacted with a mechanical contact body. By the mechanical adhesion of the foreign polymers to the contact body, they can be separated from the PET. These separation methods are described e.g. in DE4303500A1, DE4004300A1, DE3722777A1, or U.S. Pat. No. 5,236,603. In particular with flakes of PET bottle material having a high proportion of flakes of amorphous PET material, there is a disadvantage of these conventional methods in that the required operating temperatures are also above the softening point of the amorphous PET flakes and these therefore also adhere to the contact body. This in turn reduces the yield of purified PET material, i.e. the conventional methods are very ineffective.

SUMMARY OF THE DISCLOSURE

It is thus one aspect of the present disclosure to provide a method and a device for separating foreign polymers from a polymer mixture that comprises amorphous PET particles and crystalline PET particles, which results in a high quality of the resulting PET material and by which foreign polymers can be effectively separated off without reducing the yield of resulting PET material.

The disclosed method for separating foreign polymers from a polymer mixture comprising amorphous PET particles and crystalline PET particles, where the softening point of the foreign polymers is lower than that of the crystalline PET particles, includes the following steps:

separating the amorphous PET particles from the polymer mixture, heating the resulting polymer mixture to a temperature between the softening point of the foreign polymers and that of the crystalline PET particles, and separating the foreign polymers from the resulting polymer mixture.

The term "amorphous PET particles" relates to PET particles comprising no or only very small proportions of crystalline regions, preferably less than 1% of crystalline regions, in particular to PET flakes of material from neck and bottom regions of PET bottles or from ground preforms. The term "crystalline PET particles" relates to crystalline and semicrystalline PET particles having a crystallinity of at least >5%, preferably >25%, particularly preferred >40%, i.e. in particular to PET flakes of wall material from PET bottles that were subjected to cold crystallization by biaxial stretching.

The term "PET" refers to polyethylene terephthalate copolymers which can comprise other common copolymers, in particular PET material for the manufacture of packaging containers, such as beverage bottles. The term "foreign polymer" comprises any types of other polymers present in the polymer mixture, in particular PVC, PP, PE, PS, PET-G, PA or PLA.

The term "softening point" means the temperature at which the polymer passes from a solid to a liquid state, i.e. in amorphous polymers, the softening point corresponds to the glass transition point, and in (partially) crystallized polymers, it corresponds to the melting point.

The separation of the amorphous PET particles from the polymer mixture, i.e. in particular the separation of the amorphous PET particles from the crystalline PET particles, can be accomplished in any arbitrary manner, e.g. on the basis of differences in the density, crystallinity or size (wall thickness) of the particles.

After the amorphous PET particles have been separated from the polymer mixture, the resulting polymer mixture is heated to a temperature between the softening point of the foreign polymers and that of the crystalline particles, i.e. in particular to a temperature between 100 and 190° C., preferably between 130 and 170° C.

The heating of the polymer mixture to a temperature that is only above the softening point of the foreign polymers causes the separability of the softened foreign particles from the solid crystalline PET particles. On the one hand, the softening of the foreign polymers results in a change of their physical properties, such as their plasticity or adhesion tendency to surfaces, which can be utilized for the separation of the foreign polymers. On the other hand, when the foreign polymers are heated to a temperature above their softening point, they are at least partially decomposed resulting in a darkening of the foreign polymers which in turn can be utilized for the separation step.

It should be noted simultaneously that the above described temperature range is above the softening point of the amorphous PET particles. That means, without previous separation of the amorphous PET particles from the polymer mixture, the latter would also be separated from the polymer mixture in the step of the separation of the foreign polymers from the amorphous PET particles and thus no longer be available for the further recycling process.

Thus, the method results in a high quality of the resulting PET material as disturbing foreign polymers can be effectively separated off. The proportion of foreign polymers in the resulting PET material is here preferably smaller than 100 ppm, particularly preferred smaller than 10 ppm. Simultaneously, the amorphous PET particles are also separated from the foreign matters which are then available for the recycling process in contrast to conventional methods, i.e. in the present method, the yield of PET material is not reduced.

After the foreign polymers have been separated from the polymer mixture, in particular a step of returning the amorphous PET particles to the crystalline PET particles can be performed, so that the resulting PET material can be effectively further processed together.

Preferably, the step of separating the amorphous PET particles from the polymer mixture comprises an air separation process. Air separation processes separate amorphous PET particles from crystalline PET particles due to differences in their wall thickness, shape, density or diameter. In particular, air separation can be accomplished via a so-called zigzag separation process, a pneumatic sorting process or a separation table process. Corresponding processes are well-known in prior art and are not explained more in detail here. By this, amorphous PET particles can be effectively separated from the polymer mixture, i.e. from the crystalline PET particles. Only a very small proportion of foreign polymers is separated from the polymer mixture with an air separation process, i.e. the major part of them remains there.

It is furthermore preferred for the method to comprise, as the step of separating the foreign polymers, the step of contacting the resulting polymer mixture with a mechanical contact body, the contact body preferably being a rotating metal roller. The foreign polymers adhere to the mechanical contact body due to the fact that they have been heated above their softening point and their adhesion tendency is thus increased compared to the solid crystalline PET particles. Here, the step of heating the polymer mixture is particularly preferred accomplished by heating the mechanical contact body, i.e. the energy necessary to heat the polymer mixture is introduced via the heated contact body. By such separation, foreign polymers can be effectively separated from the polymer mixture.

As an alternative or in combination, the heating step causes a change of color, particularly preferred a darkening of the foreign polymers due to heating. By this, the foreign polymers can be separated from the resulting polymer mixture by detecting and sorting out the foreign polymers due to the change of color. Thus, foreign polymers can be effectively removed from the polymer mixture.

Furthermore, the method preferably comprises a step in which the separated amorphous PET particles are transformed into thermally crystallized PET particles by thermal crystallization before the step of returning them to the crystalline PET particles. Thus, the yield of crystalline PET particles can be maximized.

Particularly preferred, this thermal treatment causes a change of color, preferably a darkening, of remaining foreign polymers in the separated amorphous PET particles. The method comprises the step of manufacturing purified, thermally crystallized PET particles by the separation of the foreign polymers by detecting and sorting them out from the thermally crystallized PET particles due to their change of color. By this additional separation step, a particularly high quality of resulting PET material can be ensured.

The disclosed device for separating foreign polymers from a polymer mixture, comprising amorphous PET particles and crystalline PET particles, wherein the softening point of the foreign polymers is lower than that of the crystalline PET particles, includes:

a first separation unit for separating the amorphous PET particles from the polymer mixture, a second separation unit with a heating device for separating the foreign polymers from the resulting polymer mixture.

By the combination of the first separation unit and the second separation unit, the device can be effectively operated due to the preceding separation of the amorphous PET particles from the polymer mixture before the separation of the foreign polymers. Furthermore, a high quality of the resulting PET material can be ensured with the device.

Preferably, the device comprises a returning means for returning the amorphous PET particles to the crystalline PET particles after the separation of the foreign polymers. By this, the proportion of PET material can be maximized and the resulting PET material can be effectively processed further together.

Preferably, the first separation unit for separating the amorphous PET particles from the polymer mixture comprises an air separator, preferably a zigzag separator, a pneumatic sorter or a separation table sorter. Corresponding devices are well-known in prior art and are not illustrated more in detail here. With these separation units, amorphous PET particles can be effectively separated from crystalline PET particles, in particular material of the neck or bottom region from wall material of PET flakes of bottle material.

Furthermore, the second separation unit for separating the foreign polymers from the resulting polymer mixture is preferably a mechanical contact body, particularly preferred a rotating metal roller to which the foreign polymers adhere. The mechanical contact body in particular comprises a heating device which heats the polymer mixture, after the separation of the amorphous PET particles to a temperature between the softening point of the foreign polymers and that of the crystalline PET particles. By this second separation unit, foreign polymers can be effectively separated from PET material and thus ensure a high quality of the resulting PET material.

As an alternative or in combination, it is preferred for the second separation unit for separating the foreign polymers from the resulting polymer mixture to be a color sorting unit for detecting and sorting out foreign polymers from the resulting polymer mixture. By this color sorting unit, darkened foreign polymers that have been formed due to their heating to a temperature above their softening point can be effectively separated to thus ensure a high quality of the resulting PET material.

The device can furthermore comprise a crystallization unit for manufacturing thermally crystallized PET particles from the separated amorphous PET particles. By this crystallization unit, the amount of purified crystalline PET particles can be increased and the device can thus be designed to be particularly effective.

Here, it is in particular preferred for the device to comprise a color sorting unit for detecting and sorting out remaining foreign polymers from the thermally crystallized PET particles and for the manufacture of purified, thermally crystallized PET particles. By such a color sorting unit, possibly remaining foreign polymers can be separated from the separated amorphous PET particles, thus further increasing the quality of the resulting PET material.

BRIEF DESCRIPTION OF THE DRAWINGS

The disclosure and its advantages will be further explained with reference to the embodiments represented in the following drawings. In the drawings.

DETAILED DESCRIPTION OF THE PREFERRED EMBODIMENT

Figure 1:
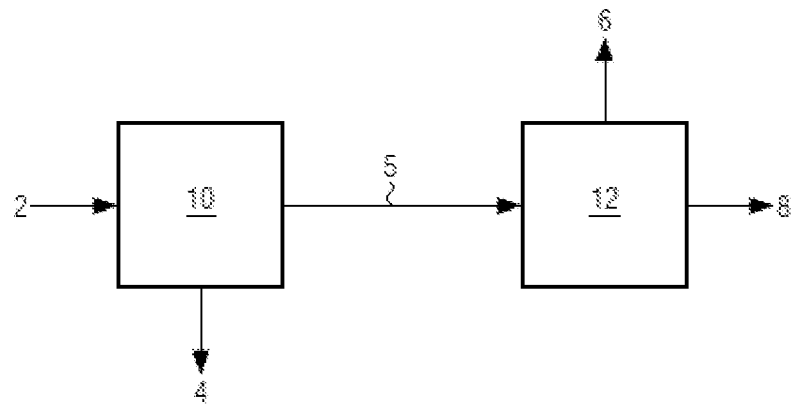
FIG. 1: shows a schematic sectional view of a device according to the disclosure.

FIG. 1 shows a device with a first separation unit (10) for separating amorphous PET particles (4) from a polymer mixture (2) and a second separation unit (12) with a heating device (not shown) for separating foreign polymers (6) from the resulting polymer mixture (5). In the process, purified crystalline PET particles (8) are generated.

In the device according to FIG. 1, a method according to the present disclosure can be carried out as follows:

The polymer mixture (2) that comprises amorphous PET particles (4), crystalline PET particles (8), and foreign polymers (6), is transformed to the first separation unit (10). There, the amorphous PET particles (4) are separated from the polymer mixture (2) via an air separator. The resulting polymer mixture (5) is transferred to a second separation unit (12) and heated to a temperature between the softening point of the foreign polymers (6) and that of the crystalline PET particles with a heating device (not shown). In the second separation unit (12), the foreign polymers (6) are subsequently separated off, separation being accomplished by contacting them with a rotating metal roller to which the foreign polymers (6) adhere. Furthermore, the heating of the resulting polymer mixture (5) causes a darkening of the foreign polymers. In an additional or an alternative separation step, the foreign polymers (6) are separated by means of detecting and sorting out the foreign polymers (6) due to this change of color via a color sorting unit (not shown). After the step of separating the foreign polymers (6), purified crystalline PET particles (8) result which are discharged from the second separation unit (12).

Figure 2:
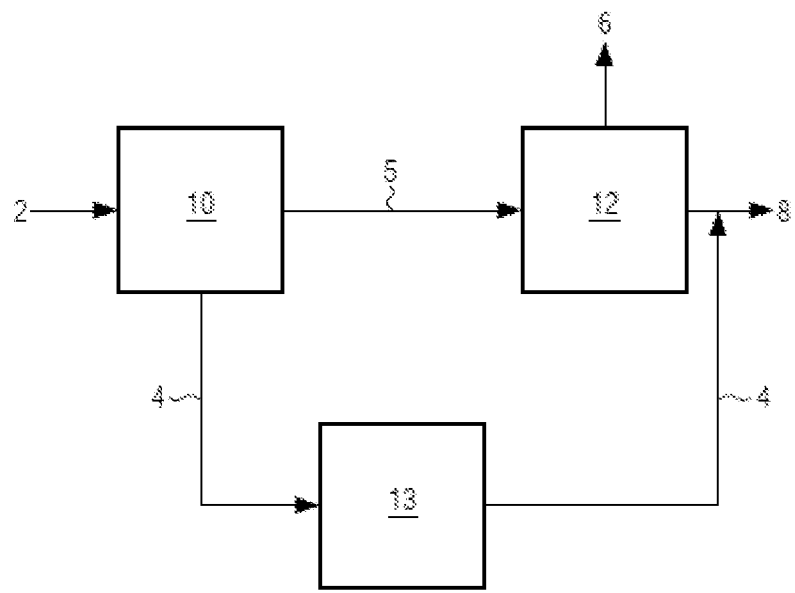
FIG. 2: shows a schematic sectional view of a preferred embodiment of a device according to the disclosure.

A preferred embodiment of the device is described in FIG. 2. It is designed analogously to the device according to FIG. 1 the difference being that this embodiment additionally contains a returning unit (13) by which the separated amorphous PET particles (4) are returned to the crystalline PET particles (8), this returning being effected after the separation of the foreign polymers (6) from the resulting polymer mixture (5).

In the device according to FIG. 2, a method according to the present disclosure can be carried out in a manner analogously to the one described above. The only difference is that the separated amorphous PET particles (4) are in addition returned to the crystalline PET particles downstream of the second separation unit (12), i.e. after the separation of the foreign polymers from the resulting polymer mixture (5).

Figure 3:
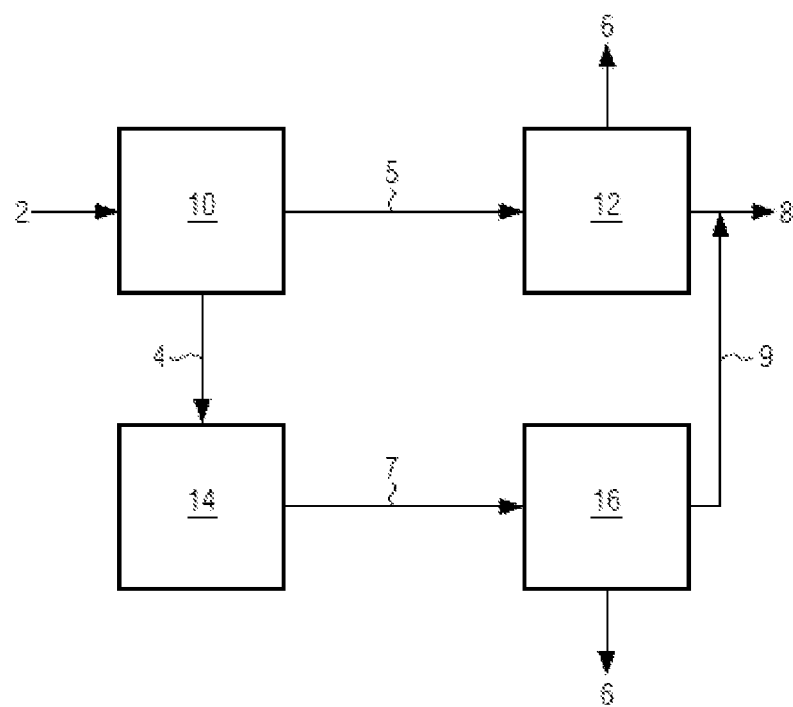
FIG. 3: shows a schematic sectional view of a preferred embodiment of a device according to the disclosure.

Another preferred embodiment of the device is described in FIG. 3. It is designed analogously to the devices according to FIGS. 1 and 2, the difference being that the returning unit (not shown here) contains a crystallization unit (14) for manufacturing thermally crystallized PET particles (7). The preferred embodiment furthermore comprises a color sorting unit (16) for detecting and sorting out remaining foreign polymers (6) from the thermally crystallized PET particles (7) and for manufacturing purified, thermally crystallized PET particles (9).

In the device according to FIG. 3, a method according to the present disclosure can be carried out in a manner analogous to that described above. The difference to the embodiment according to FIG. 2 is that within the step of returning the amorphous PET particles (4), the latter are previously transformed to thermally crystallized PET particles (7) by thermal crystallization. This thermal crystallization simultaneously causes a darkening of remaining foreign polymers (6), which are separated from the thermally crystallized PET particles (7) in the color sorting unit (16) by detecting and sorting them out. Subsequently, the purified crystallized PET particles (9) are added to the crystalline PET particles (8).

The invention claimed is:

1. Method of separating foreign polymers from a polymer mixture, comprising amorphous PET particles and crystalline PET particles, wherein the softening point of the foreign polymers is lower than that of the crystalline PET particles, comprising:

separating the amorphous PET particles from the polymer mixture, wherein the separated amorphous PET particles are transformed into thermally crystallized PET particles by thermal crystallization, heating the resulting polymer mixture to a temperature between the softening point of the foreign polymers and that of the crystalline PET particles, separating the foreign polymers from the resulting polymer mixture.

2. The method according to claim 1, further comprising the step of returning the separated PET particles to the crystalline PET particles after the step of separating the foreign polymers from the resulting polymer mixture.

3. The method according to claim 1, wherein the step of separating the amorphous PET particles from the polymer mixture is an air separation process.

4. The method according to claim 1, wherein the step of separating the foreign polymers comprises contacting them with a mechanical contact body, to which the foreign polymers adhere, and wherein the step of heating the resulting polymer mixture is effected by heating the mechanical contact body.

5. The method according to claim 1, wherein the step of heating causes a change of color of the foreign polymers, and the step of separating the foreign polymers from the resulting polymer mixture comprises detecting and sorting out the foreign polymers on the basis of the change of color.

6. The method according to claim 1, wherein thermal crystallization causes a change of color of remaining foreign polymers, and wherein the method further comprises manufacturing purified thermally crystallized PET particles by separating the foreign polymers by detecting and sorting them out from the thermally crystallized PET particles due to their change of color.

7. The method according to claim 3, wherein the air separation process is one of a zigzag separation process, a pneumatic sorting process, and a separation table sorting process.

8. The method according to claim 4, wherein the mechanical contact body is a rotating metal roller.

9. The method according to claim 5, wherein the change of color is a darkening.

10. The method according to claim 6, wherein the change of color is a darkening.

* * * * *